United States Patent [19]

Hollingsworth

[11] Patent Number: 5,044,971
[45] Date of Patent: Sep. 3, 1991

[54] TWO CORD CONNECTOR SYSTEM FOR PREFABRICATED PANELS

[75] Inventor: Elmont F. Hollingsworth, Austin, Tex.

[73] Assignee: Minnesota Mining and Manufacturing Company, St. Paul, Minn.

[21] Appl. No.: 538,138

[22] Filed: Jun. 14, 1990

[51] Int. Cl.[5] .............................................. H01R 4/60
[52] U.S. Cl. ...................................... 439/21.5; 439/650
[58] Field of Search ............... 439/502, 503, 505, 506, 439/368, 624, 120, 207, 209, 210, 216, 639, 211

[56] References Cited

U.S. PATENT DOCUMENTS

| 2,608,634 | 8/1952 | Abbott | 219/19 |
| 2,748,359 | 5/1956 | Swan | 339/28 |
| 3,466,453 | 9/1969 | Greenberg | 307/10 |
| 3,584,213 | 6/1971 | Meltzer | 439/650 |
| 3,841,042 | 10/1974 | Siegal | 52/239 |
| 4,043,626 | 8/1977 | Propst et al. | 339/23 |
| 4,060,294 | 9/1977 | Haworth et al. | 339/4 |
| 4,124,265 | 11/1978 | Turk | 339/97 |
| 4,135,775 | 1/1979 | Driscoll | 339/22 R |
| 4,203,639 | 5/1980 | VandenHoek et al. | 339/22 |
| 4,235,495 | 11/1980 | Propst et al. | 339/22 |
| 4,241,965 | 12/1980 | Wilson et al. | 339/4 |
| 4,277,123 | 6/1981 | Haworth et al. | 339/22 |
| 4,295,697 | 10/1981 | Grime | 339/22 |
| 4,367,370 | 1/1983 | Wilson et al. | 174/48 |
| 4,370,008 | 1/1983 | Haworth et al. | 339/4 |
| 4,377,724 | 3/1983 | Wilson | 174/48 |
| 4,445,737 | 5/1984 | Long et al. | 339/18 |
| 4,596,098 | 6/1986 | Finkbeiner et al. | 52/220 |
| 4,607,906 | 8/1986 | Munroe | 430/650 |
| 4,716,698 | 1/1988 | Wilson et al. | 52/239 |
| 4,740,167 | 4/1988 | Millhimes et al. | 439/640 |

FOREIGN PATENT DOCUMENTS 2012497 7/1979 United Kingdom ............... 439/207

Primary Examiner—Larry I. Schwartz
Assistant Examiner—Hien D. Vu
Attorney, Agent, or Firm—Gary L. Griswold; Walter N. Kirn; Jack V. Musgrove

[57] ABSTRACT

A wiring system for modular structures, such as prefabricated panels, which utilizes two types of cord assemblies to distribute electrical energy throughout the structures. The first cord assembly is comprised of an electrical cable having a plurality of conductors which is terminated on both ends by male electrical connectors. The first cord assembly also has a tap in an intermediate position which includes two additional male electrical connectors of the same type. This cord assembly is used to connect two adjacent panels together electrically. To connect an additional panel to this junction, a second cord assembly having a female electrical connector on one end and a male electrical connector on the other end is used to connect the additional panel to the tap of the first cord assembly. Consequently, a plurality of panels can be connected together using only these two types of cord assemblies to provide for the distribution of electrical power throughout the panel system.

11 Claims, 3 Drawing Sheets

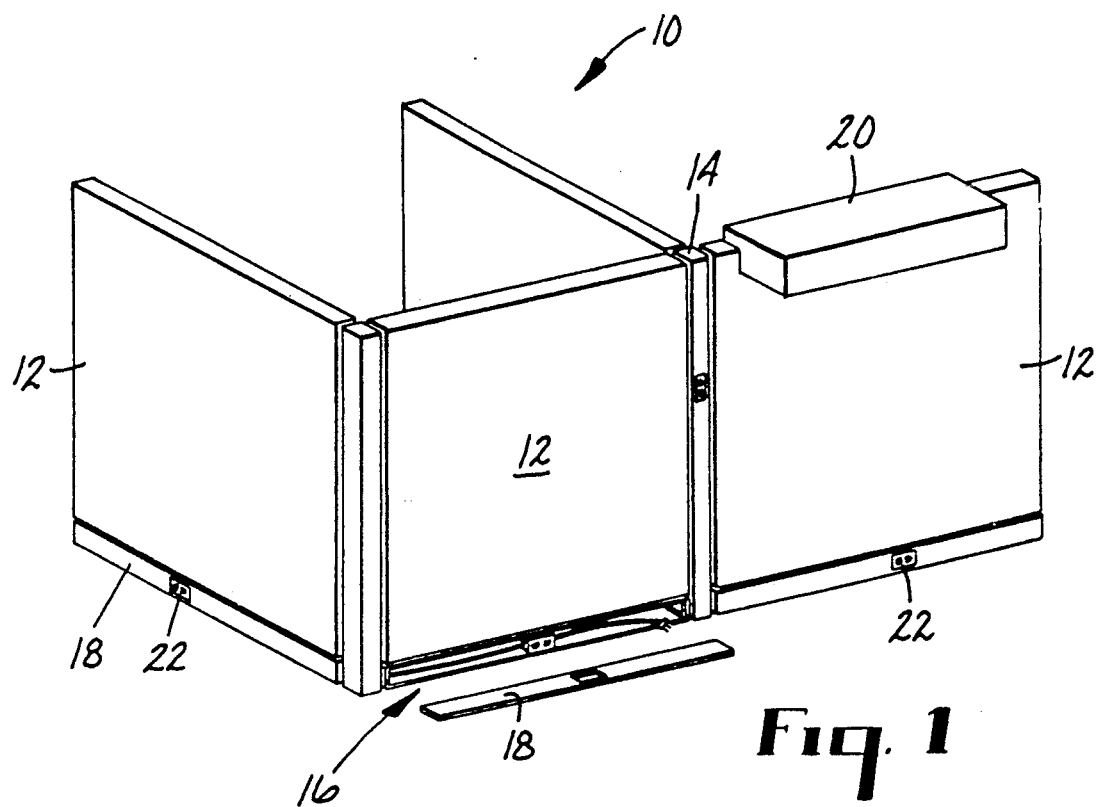
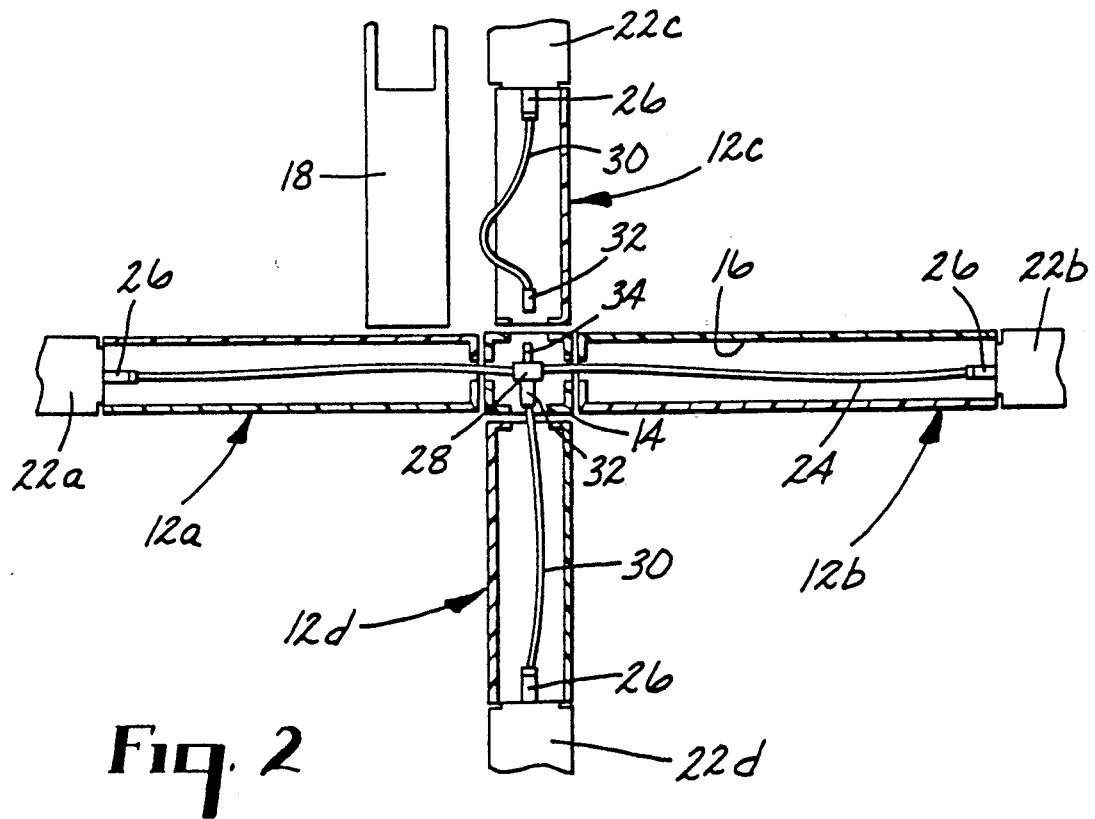

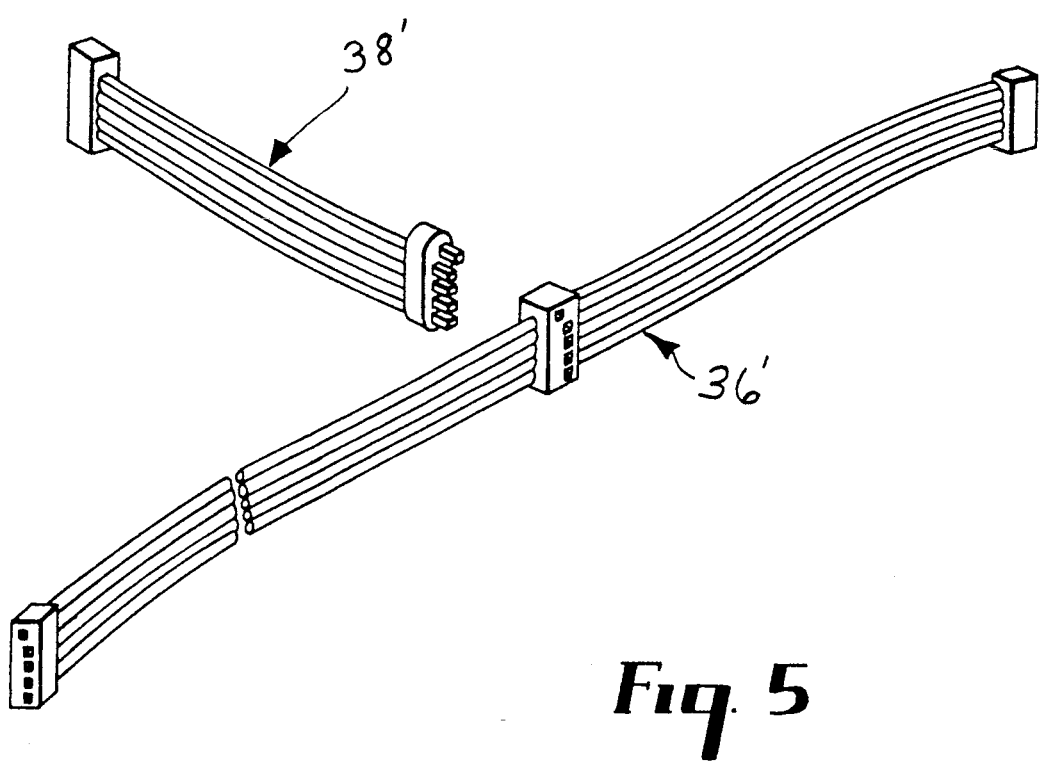
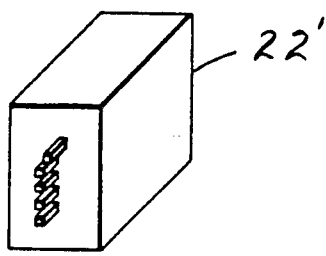
Fig. 5

TWO CORD CONNECTOR SYSTEM FOR PREFABRICATED PANELS

BACKGROUND OF THE INVENTION

1. Field of the Invention

The present invention generally relates to electrical connectors for wiring systems, and more particularly to the distribution of power to, and the interconnection of, electrical outlets and lighting fixtures in modular structures, such as prefabricated wall panels.

2. Description of the Prior Art

Modular office wall panel systems which can be used to divide a large office space into many smaller spaces are an effective alternative to permanent office construction. These systems consist of a plurality of upright panels which are usually prefabricated, and can be locked together in a variety of different configurations to provide flexible and efficient use of floor space.

These panels are generally prewired for electrical devices such as lighting fixtures and standard electrical receptacles. Provision must therefore be made to allow for the distribution of electricity throughout the entire array of interconnected panels. Several variations of wiring systems for modular structures exist, some of which are disclosed in the following patents:

| Patent | Applicant(s) |
| --- | --- |
| U.S. Pat. No. 2,608,634 | C. Abbott |
| U.S. Pat. No. 4,043,626 | Propst et al. |
| U.S. Pat. No. 4,135,775 | R. Driscoll |
| U.S. Pat. No. 4,203,639 | VandenHoek et al. |
| U.S. Pat. No. 4,235,495 | Propst et al. |
| U.S. Pat. No. 4,241,965 | Wilson et al. |
| U.S. Pat. No. 4,277,123 | Haworth et al. |
| U.S. Pat. No. 4,295,697 | P. Grime |
| U.S. Pat. No. 4,367,370 | Wilson et al. |
| U.S. Pat. No. 4,370,008 | Haworth et al. |
| U.S. Pat. No. 4,377,724 | H. Wilson |
| U.S. Pat. No. 4,445,737 | Long et al. |
| U.S. Pat. No. 4,596,098 | Finkbeiner et al. |
| U.S. Pat. No. 4,716,698 | Wilson et al. |
| U.S. Pat. No. Re. 31,733 | Haworth et al. |

These patents present many alternatives in supplying power to prefabricated panels, but they nonetheless suffer significant disadvantages. For example, most of these systems rely on specialized terminal blocks, power tracks, receptacles, etc. which are not compatible with alternative systems. This means that, once a particular system has been selected and installed, the user is thereafter committed to that same system in any future expansions. The cost of these systems is necessarily increased due to the extra expense associated with the manufacture of the specialized components, even though many optional features are never utilized in practice.

Another disadvantage relates to the manner in which prior art systems serially connect the electrical devices to the power supply. This results in a chain of multiple connections leading to any given device, increasing the chances that no power will be delivered at all due to a single faulty connection in the chain. A longer current path also means more power loss. Moreover, in some systems this leads to the wasteful and convoluted overlap of supply cables (see, e.g., U.S. Pat. No. 4,135,775, FIG. 4a). It would be preferable to connect the power circuit in parallel to adjacent panels; such an arrangement has, however, been difficult to accomplish due to the limited number of connections that may be made at prior art terminal blocks.

Finally, prior art wiring systems do not allow sufficient variability in the placement of connectors along the panels. On the contrary, several of the foregoing patents rigidly specify the location of the terminal block, e.g., as being fixedly attached to one end of the panel. This unduly complicates, and limits use of, such systems.

Accordingly, the primary objective of this invention is to provide a system for distributing electricity to modular structures incorporating a cord assembly which is simple to use and install, and which allows more flexibility in placement. Another objective of this invention is to provide a cord assembly which would reduce the number of overall junctions in the power supply chain, and reduce redundant and overlapping cables, yet provide a reliable means for supplying multiple power connections in parallel. A further objective of this invention is to facilitate expansion of circuits and be easily adapted to alternative wiring systems.

SUMMARY OF THE INVENTION

The foregoing objectives are achieved by the use of two cord assemblies. The preferred embodiment comprises a first electrical cord assembly which consists of an electrical cable having a plurality of conductors terminated on either end by male electrical connectors. At an intermediate point of this cable a tap is incorporated which includes two additional separable electrical male connectors. This first electrical cord assembly is used to electrically connect two panels together end to end, and is positioned along raceways in each panel. The two panels are connected together electrically by positioning this first electrical cord assembly into the raceway of each panel so that the intermediate tap of the cord is approximately at the junction of the panels. Each end of the electrical cord assembly is connected to junction blocks containing electrical outlets, located at an intermediate point of the raceway of each panel.

If an additional panel is needed at this junction, power may be supplied thereto by the use of a second electrical cord assembly consisting of a cable that is compatible with that of the first electrical cord assembly, terminated at one end with a female electrical connector and at the other end with a male electrical connector. To join the additional panel to the junction of two panels connected in line with each other, the female electrical connector of this second electrical cord assembly is connected with one of the male electrical connectors located on the intermediate tap of the first electrical cord assembly. The male electrical connector of the second electrical cord assembly is connected to a junction block situated at the midpoint of the raceway of the additional panel.

Through the use of these two electrical cord assemblies, up to four panels can be connected together at a single junction. Because the cable of the electrical cord assembly is pliant, and not rigidly attached to the panel at the junction, the alignment of the panels at their point of attachment with each other is not critical, as it is with some prior art connector systems. The panels can therefore be joined together at various angles to each other. Such a construction combines flexibility and efficiency in the distribution of power to electrical devices incorporated into the panel architecture.

BRIEF DESCRIPTION OF THE DRAWINGS

The invention will be further described by reference to the accompanying drawings, wherein:

FIG. 1 is a perspective view of a modular structure comprising a plurality of interconnected prefabricated panels, with the detachable closure of the raceway of one panel being removed to expose interior of the raceway;

FIG. 2 is a horizontal-sectional view of the raceways of four intersecting panels, also illustrating the corresponding cable connections;

FIG. 5 is a perspective view similar to FIG. 3, depicting an alternative embodiment wherein female connectors are used in lieu of male connectors and vice versa.

DESCRIPTION OF THE PREFERRED EMBODIMENTS

Figure 3:
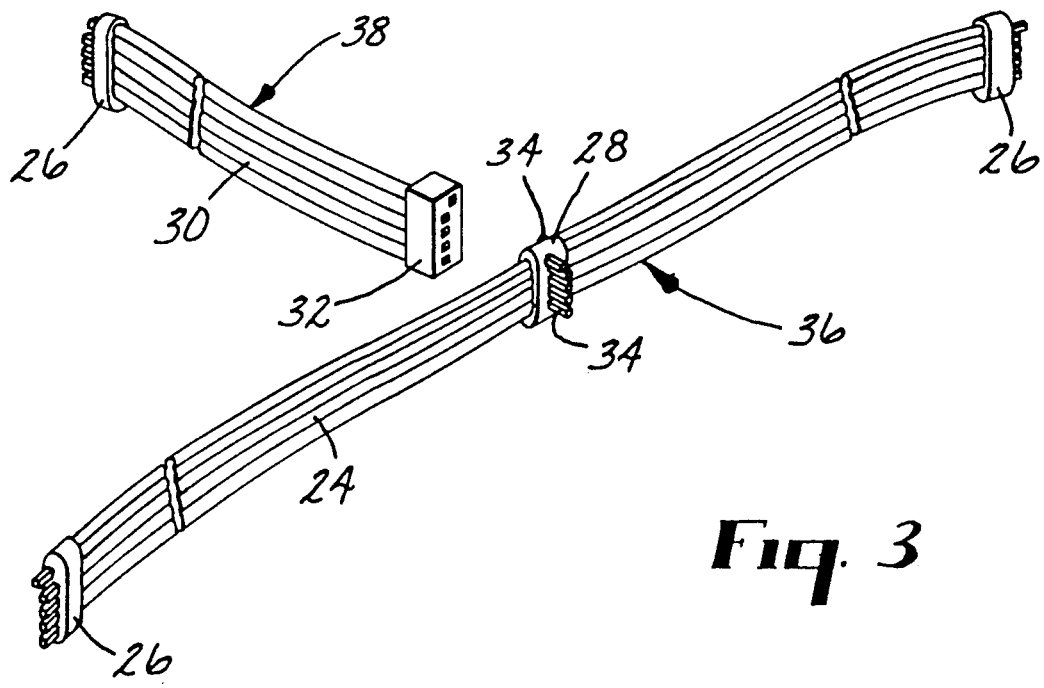
FIG. 3 is a perspective view of the two different electrical cord assemblies of the present invention.

Referring now to the drawings, and in particular with reference to FIG. 1, there is depicted a modular structure 10 comprised of a plurality of interconnected, prefabricated panels 12 forming walls or partitions which subdivide a room or office space. Panels 12 are attached to one another by means of connecting posts or columns 14, and include raceway structures 16 which typically have detachable closures 18. Modular structure 10 further includes electrical devices such as a lighting fixture 20 and junction blocks 22 which contain electrical outlets. e.g., standard 3-pole receptacles.

Panels 12 are known in the art, and generally comprise two outer layers defining an internal space which may be left hollow, or filled with thermal insulation, soundproofing material, etc. Panels 12 may be of any desired dimensions (i.e., height, length, and width) depending upon the type of partitioning to be effected.

Referring now to FIG. 2, electrical power is delivered to the panel arrangement by a wiring system traversing raceways 16. Raceways 16 are generally only in the lower part of a panel 12 but not necessarily. In the present invention, the wiring system consists of two electrical cord assemblies (see FIG. 3). In the preferred embodiment, first electrical cord assembly 36 is made up of electrical cable 24, a male electrical connector 26 at each end of cable 24, and a tap 28 affixed intermediate the ends of the cable, preferably at the midpoint of cable 24, which includes two male type electrical connectors 34. Tap 28 is preferably an insulation displacement connector having a plurality of contact elements which provide conductivity between the conductors and the connector prongs. This type of tap facilitates the attachment of additional taps when needed. A second electrical cord assembly 38 consists of cable 30 terminated on one end by a male electrical connector 26 and on the other end by a female electrical connector 32.

In the preferred embodiment, the male electrical connector 26 has a plurality of blade type connector elements, and the female electrical connector 32 has a plurality of tuning fork type connector elements. The connection is made by inserting the blade element between the forks of the tuning fork portion of the tuning fork element, thereby making wiping contact. However, the invention will work just as well with other types of electrical connectors.

The first electrical cord assembly 36 provides for electrical distribution between two panels arranged end to end and abutting each other. To join panels 12a and 12b together as shown in FIG. 2, the first electrical cord assembly 36 is positioned in raceway 16 of panel 12a and male electrical connector 26 is connected to junction block 22a. Male electrical connector 26 at the distal end of first electrical cord assembly 36 is connected to the junction block 22b of panel 12b. Junction blocks 22a and 22b have female connectors, similar to female electrical connector 32, which mate with the male connectors 26. The tap 28 of first electrical cord assembly 36 is positioned in column 14 to allow for the connection of other panels if desired.

To connect panel 12c to the junction of panels 12a and 12b, second electrical cord assembly 38 is employed. Female electrical connector 32 of second electrical cord assembly 38 is connected to separable electrical male connector 34 of tap 28. Second electrical cord assembly 38 traverses raceway 16 of panel 12c and is connected to junction block 22c with male electrical connector 26. If an additional panel 12d is required at the junction of panels 12a, 12b, and 12c, it is connected to the junction in the same manner as described for panel 12c, using the unused separable electrical male connector of tap 28. The invention allows for as many as four panels 12 to be connected at a junction with no redundant or overlapping wiring.

Figure 4:
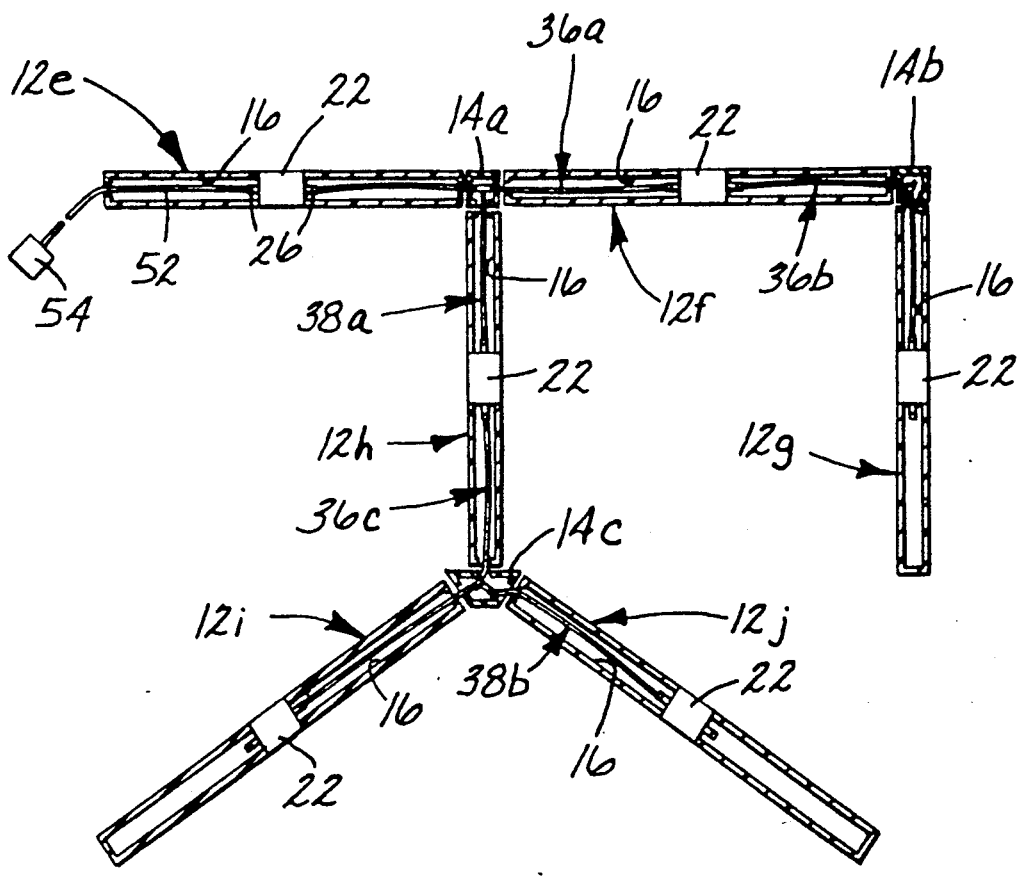
FIG. 4 is a horizontal-sectional view of the raceways of a panel arrangement having "T", "L" and "Y" intersections.

The improved flexibility and efficiency in the use of the present invention may best be understood with reference to FIG. 4, to which attention is now directed. In an exemplary setting, an electrical cable 52 is attached to an external power source through a field connection to a junction box 54. Electrical cable 52 enters raceway 16 of the first panel 12e and connects to junction block 22 of panel 12e using male electrical connector 26. Electrical power is distributed from panel 12e to panel 12f by using first electrical cord assembly 36a. A first electrical cord assembly 36a is positioned in the raceways of panels 12e and 12f and through column 14a. The male electrical connector 26 on either end of first electrical cord assembly 36a is plugged into the junction blocks 22 of panels 12e and 12f respectively. Other panels, such as panel 12g, can be quickly and easily added in a chain of panels using additional first electrical cord assemblies. In the preferred embodiment, a flexible cable is used in the two cord system that allows it to be curved around in a variety of different angles. For example, panels 12f and 12g are shown positioned at 90° angles to each other.

To add another panel to the junction of panels 12e and 12f where there is a first electrical cord assembly 36a, a second electrical cord assembly is employed. In FIG. 4, panel 12h is shown connected to the junction of panels 12e and 12f using a second electrical cord assembly 38a. Second electrical cord assembly 38a is arranged in raceway 16 of panel 12h so that female electrical connector 32 of second electrical cord assembly 38a can be attached to male electrical connector 34 on tap 28 of first electrical cord assembly 36a (refer to FIG. 2 for detail on how connections are made). Male electrical connector 26 of second electrical cord assembly 38a can be attached to junction block 22 of panel 12h. Panels 12h, 12i, and 12j are arranged in a "Y" using one first electrical cord assembly 36c between panels 12h and 12i, with panel 12j added using another second electrical cord assembly 38b.

In the preferred embodiment, the electrical cables 24 and 30 will consist of five insulated conductors. Five conductors are provided inasmuch as the power supply for a panel structure commonly employs five separate conductive paths: one for ground, one for a neutral line, and three "hot" lines for 3-phase voltage. Of course, more or less conductors could be used, depending upon the intended application. To meet certain state and agency approval, in addition to being insulated, the conductors must also have abrasion protection. The type of protection that is preferred is flexible overmolding that will give adequate protection, and still allow the panels 12 to be joined together at various angles. Also, the connectors would preferably have a polarizing feature incorporated into them to insure that the connectors are always connected in the proper orientation. This can be done, for example, by slightly offsetting one element of each of the electrical connectors 26 and 32.

Also in the preferred embodiment, the electrical connectors of the first electrical cord assembly 36 are all male electrical connectors. However, the invention will work just as well if the male electrical connectors 26 and 34 are replaced with female electrical connectors 32 on the first electrical cord assembly 36, and the second electrical cord assembly 38 is turned around so that the male electrical connector 26 can be connected to the female electrical connector on the tap 28. The connectors on the junction blocks of the panels must also be changed (i.e., be male rather than female) so that electrical connection is possible with the first electrical cord assembly 36. FIG. 5 depicts such a system, wherein a first cord 36' has only female connectors attached thereto. A second cord 38' has a male connector at one end for mating with the female connectors of cord 36, and a female connector at the other. A junction box 22' is also shown with a male connector for receiving one end of cord 36'.

Since panels 12 can be of any desired dimension, the distance each electrical cord assembly 36 and 38 will have to span in order to connect adjoining panels 12 may vary. The various distances encountered may be accommodated by producing electrical cord assemblies 36 and 38 of several different lengths. However, to simplify assembly of modular structures 10, it is desired that electrical cord assemblies 36 and 38 be produced in only one or two standard lengths. This can be done by varying the length of junction block 22 in the panels 12 so that the distance the electrical cord assembly 36 or 38 has to span is the same regardless of the length of the panel.

The modular structure shown in FIG. 4 could easily be modified as required. Additionally, columns 14a–14c may be any shape necessary to accommodate individual needs and may further accommodate power supply cables which are provided within the ceiling. Also, if a junction of panels 12 is desired without the use of a column 14, the flexibility of the cables permits the junction to be made without modifing the length of the cables. Finally, adding multiple taps 28 to first electrical cord assembly 36 will allow any number of panels 12 to be added to a junction.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. A wiring system for distributing electrical power, comprising:
    a first electrical cord having a plurality of insulated conductors, and having first and second ends, each of said ends terminating in substantially identical male connectors;
    a tap connector attached to said first electrical cord intermediate said first and second ends thereof, said tap connector having a male connector which is substantially identical to said male connectors on said ends of said first electrical cord;
    a first junction block having a female connector which matingly engages one of said male connectors of said first electrical cord, said junction block further having at least one electrical outlet;
    a second electrical cord having a plurality of insulated conductors, and having first and second ends, said first end terminating in a female connector which is substantially identical to said female connector of said junction block, said female connector of said second electrical cord matingly engaging said male connector of said tap connector, and said second end of said second electrical cord terminating in a male connector which is substantially identical to said male connector on said ends of said first electrical cord; and
    a second junction block substantially identical to said first junction block, attached to said male connector of said second electrical cord.

2. The wiring system of claim 1 wherein said tap connector is an insulation displacement connector.

3. The wiring system of claim 1 wherein said first and second electrical cords each have five conductors.

4. The wiring system of claim 1 wherein each of said male connectors and each of said female connectors includes polarizing means for insuring that each of said connectors is properly oriented.

5. The wiring system of claim 1 further comprising means for connecting said first electrical cord to an external power supply.

6. A wiring system for distributing electrical power, comprising:
    a first electrical cord having a plurality of insulated conductors, and having first and second ends, each of said ends terminating in substantially identical female connectors;
    a tap connector attached to said first electrical cord intermediate said first and second ends thereof, said tap connector having a female connector which is substantially identical to said female connectors on said ends of said first electrical cord;
    a first junction block having a male connector which matingly engages one of said female connectors of said first electrical cord, said junction block further having at least one electrical outlet;
    a second electrical cord having a plurality of insulated conductors, and having first and second ends, said first end terminating in a male connector which is substantially identical to said male connector of said first junction block, said male connector of said second electrical cord matingly engaging said female connector of said tap connector, and said second end of said second electrical cord terminating in a female connector which is substantially identical to said female connector on said ends of said first electrical cord; and a second junction block substantially identical to said first junction block, attached to said female connector of said second electrical cord.

7. The wiring system of claim 6 wherein said tap connector is an insulation displacement connector.

8. The wiring system of claim 6 wherein said first and second electrical cords each have five conductors.

9. The wiring system of claim 6 wherein each of said male connectors and each of said female connectors includes polarizing means for insuring that each of said connectors is properly oriented.

10. The wiring system of claim 6 further comprising means for connecting said first electrical cord to an external power supply.

11. In a modular office structure having first, second and third prefabricated panels which are attached at a common location, each of the panels having a raceway, a wiring system for distributing electrical power to each of the panels, the wiring system comprising:

first, second and third junction blocks located in the raceways of the first, second and third panels, respectively, each of said junction blocks having a female connector and at least one electrical outlet;

a first electrical cord having five insulated conductors, and having first and second ends respectively terminating in first and second, substantially identical, male connectors, said first electrical cord running through and between the raceways of the first and second panels, said male connector on said first end being attached to said female connector on said first junction block, and said male connector on said second end being attached to said female connector on said second junction block;

a tap connector attached to said first electrical cord intermediate said first and second ends thereof, and proximate the common location of attachment of the panels, said tap connector having a male connector which is substantially identical to said male connectors on said ends of said first electrical cord; and a second electrical cord having five insulated conductors, and having first and second ends, said second electrical cord running through the raceway of the third panel, said first end terminating in a female connector which is substantially identical to said female connector of said junction blocks, said female connector of said second electrical cord being attached to said male connector of said tap connector, and said second end of said second electrical cord terminating in a male connector which is substantially identical to said male connector on said ends of said first electrical cord, said male connector of said second electrical cord being attached to said female connector of said third junction block.

* * * * *